(12) United States Patent  (10) Patent No.: US 9,305,248 B2
Iwaishi  (45) Date of Patent: Apr. 5, 2016

(54) TEST PATTERN DATA, NON-TRANSITORY COMPUTER READABLE MEDIUM, AND TEST PATTERN

(71) Applicant: FUJI XEROX CO., LTD., Tokyo (JP)

(72) Inventor: Akira Iwaishi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/660,252

(22) Filed: Mar. 17, 2015

(65) Prior Publication Data
US 2015/0278647 A1 Oct. 1, 2015

(30) Foreign Application Priority Data

Mar. 31, 2014 (JP) ................. 2014-074588

(51) Int. Cl.
G06K 15/00 (2006.01)
H04N 1/46 (2006.01)
G06K 15/02 (2006.01)
B41J 2/21 (2006.01)

(52) U.S. Cl.
CPC ............. *G06K 15/027* (2013.01); *B41J 2/2146* (2013.01)

(58) Field of Classification Search
USPC .......................... 358/1.14, 2.1, 3.26, 504, 530
See application file for complete search history.

(56) References Cited

U.S. PATENT DOCUMENTS

| 5,500,661 | A | * | 3/1996 | Matsubara | B41J 19/147 347/16 |
| 6,474,768 | B1 | * | 11/2002 | Yano | H04N 1/6033 347/19 |
| 8,711,441 | B2 | | 4/2014 | Shimizu | |
| 2010/0215392 | A1 | * | 8/2010 | Shiraki | G03G 15/5062 399/72 |
| 2011/0148964 | A1 | * | 6/2011 | Mochizuki | B41J 2/2132 347/12 |
| 2012/0229575 | A1 | * | 9/2012 | Ikegami | C09D 11/322 347/56 |
| 2014/0292863 | A1 | * | 10/2014 | Tanase | B41J 2/12 347/13 |
| 2014/0308609 | A1 | * | 10/2014 | Nakazato | G03G 9/08711 430/108.11 |

FOREIGN PATENT DOCUMENTS

JP 2006-168195 A 6/2006
JP 2012-139901 A 7/2012

* cited by examiner

Primary Examiner — Jerome Grant, II
(74) Attorney, Agent, or Firm — Oliff PLC

(57) ABSTRACT

Test pattern data corresponds to a test pattern including a first pattern area and a second pattern area. In the first pattern area, patterns extending in a second direction are provided in a stepwise manner in correspondence with respective recording elements such that a gap in the second direction is provided between a back end of one of the patterns or each pattern and a front end of the pattern adjacent thereto. In the second pattern area, pattern columns extending in the second direction are provided in a stepwise manner in correspondence with a set of a predetermined number of consecutively provided recording elements such that a gap in the second direction is provided between a back end of one of the pattern columns or each pattern column and a front end of the pattern column adjacent thereto, the predetermined number being two or more consecutively provided recording elements.

10 Claims, 9 Drawing Sheets

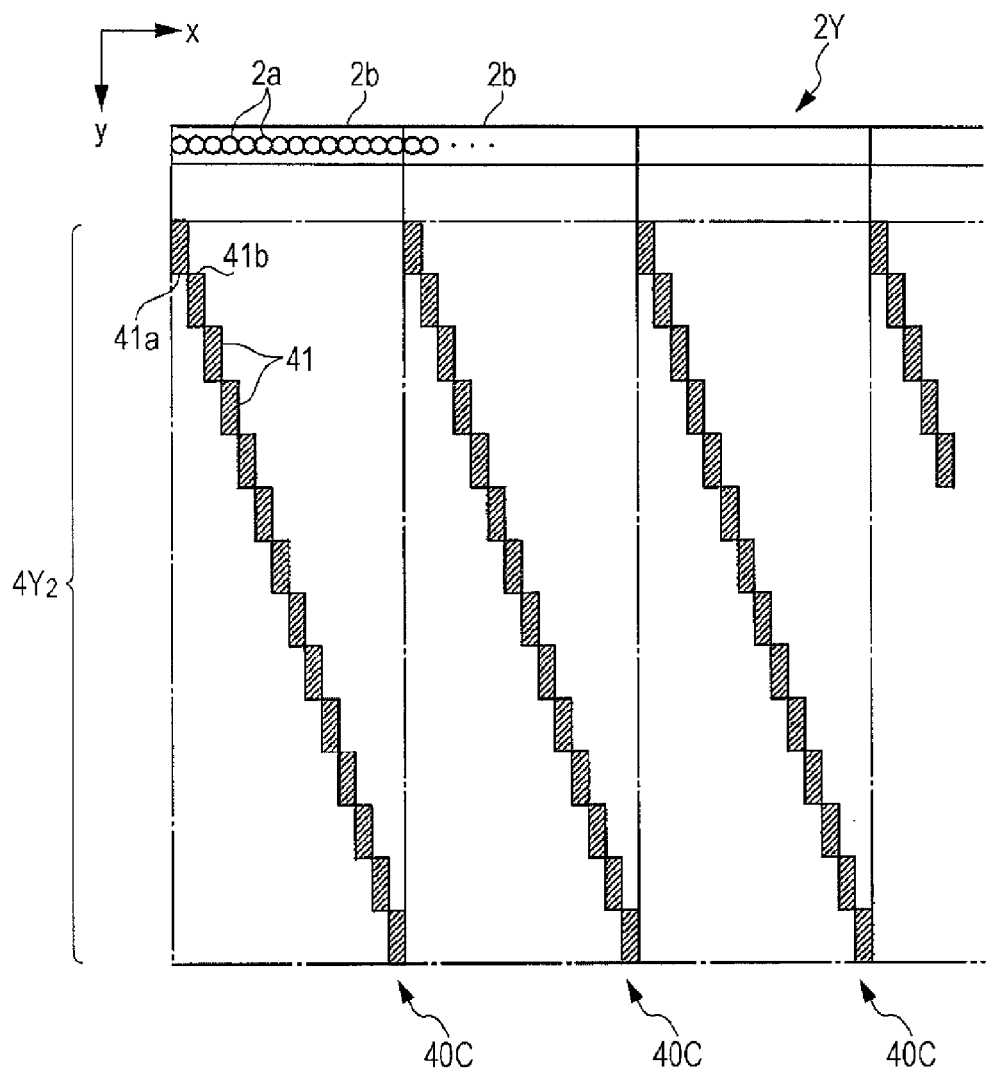

TEST PATTERN DATA, NON-TRANSITORY COMPUTER READABLE MEDIUM, AND TEST PATTERN

CROSS-REFERENCE TO RELATED APPLICATIONS

This application is based on and claims priority under 35 USC 119 from Japanese Patent Application No. 2014-074588 filed Mar. 31, 2014.

BACKGROUND (i) Technical Field

The present invention relates to test pattern data, a non-transitory computer readable medium, and a test pattern.

(ii) Related Art

In recent years, for increasing speed, one-pass printing using recording heads having a sheet width size is carried out. One-pass printing refers to printing by discharging ink drops while transporting recording paper with the recording heads being fixed, each recording head including nozzles that discharge ink and that are arranged for a length which is substantially equivalent to the width of the recording paper.

SUMMARY

According to an aspect of the invention, there is provided test pattern data corresponding to a test pattern that is printed on a recording medium by driving recording heads while moving the recording medium relative to the recording heads in a second direction that is orthogonal to a predetermined first direction, the recording heads being arranged for respective colors in the second direction and including recording elements that are arranged in the first direction. The test pattern includes a first pattern area and a second pattern area. A pattern which has a color whose brightness differs from that of a ground color of the recording medium by a difference that is greater than or equal to a predetermined brightness difference is recorded in the first pattern area. A pattern which has a color whose brightness differs from that of the ground color of the recording medium by a difference that is less than the predetermined brightness difference is recorded in the second pattern area. In the first pattern area, patterns having a same length and extending in the second direction are provided in a stepwise manner in correspondence with the respective recording elements such that a gap in the second direction is provided between a back end of one of the patterns or each pattern and a front end of another one of the patterns that is adjacent thereto. In the second pattern area, pattern columns having a same length and extending in the second direction are provided in a stepwise manner in correspondence with a set of a predetermined number of consecutively provided recording elements such that a gap in the second direction is provided between a back end of one of the pattern columns or each pattern column and a front end of another one of the pattern columns that is adjacent thereto, the predetermined number of consecutively provided recording elements being two or more consecutively provided recording elements.

BRIEF DESCRIPTION OF THE DRAWINGS

Exemplary embodiments of the present invention will be described in detail based on the following figures, wherein:

FIG. 9 shows a modification of the third pattern area.

DETAILED DESCRIPTION

Figure 1:
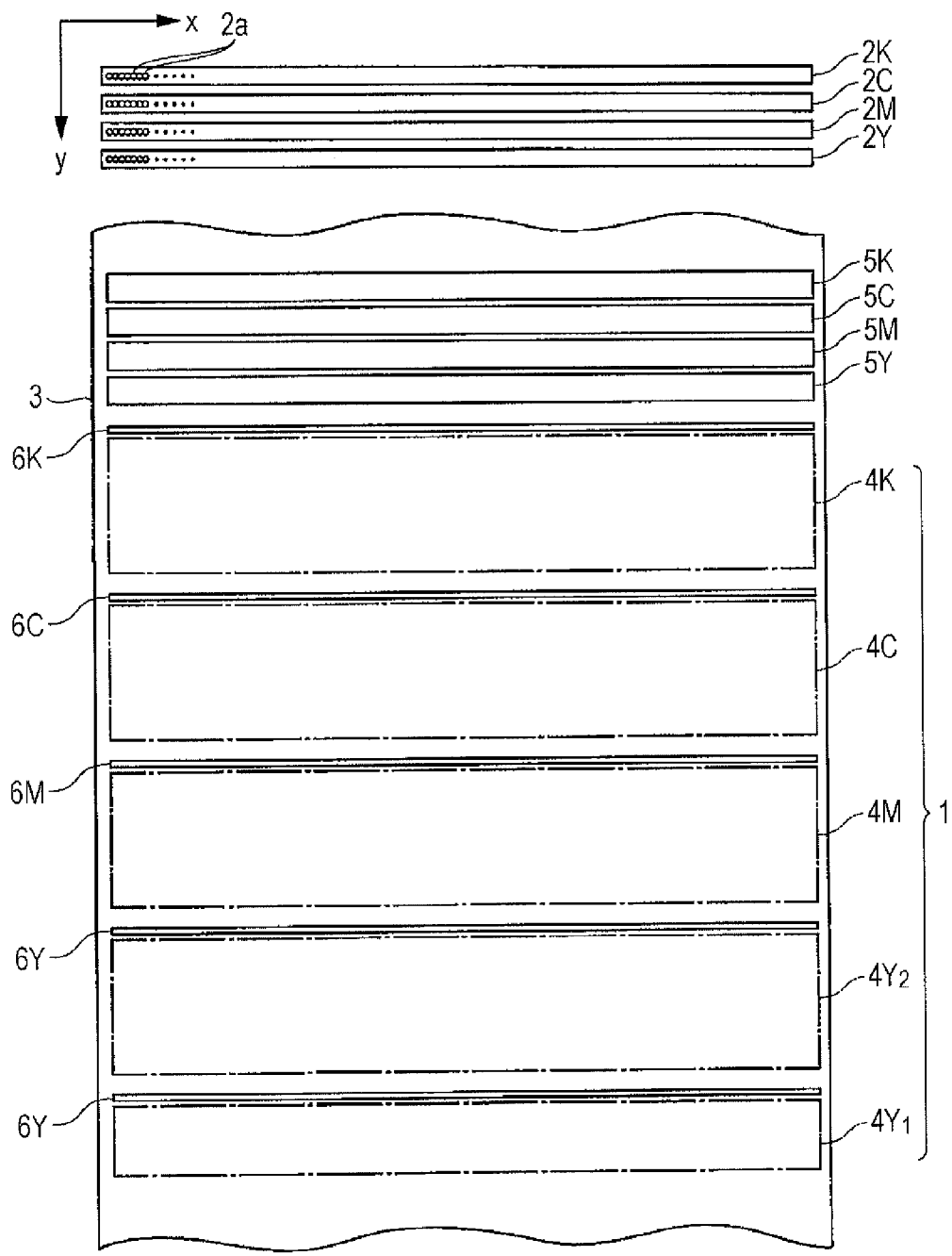
FIG. 1 is a plan view of a test pattern and recording heads according to a first exemplary embodiment of the present invention.

Exemplary embodiments of the present invention are hereunder described in detail with reference to the drawings. In the figures, structural components having substantially the same functions are given the same reference numerals and the same descriptions thereof are not repeated.

First Exemplary Embodiment

FIG. 1 is a plan view of an exemplary schematic structure of a test pattern 1 and each of recording heads 2K, 2C, 2M, and 2Y according to a first exemplary embodiment of the present invention. A case in which inkjet recording heads of a liquid drop discharging apparatus are used as the recording heads 2K, 2C, 2M, and 2Y is hereunder described.

Overall Structure of Test Pattern

The test pattern 1 is formed on continuous paper 3 by driving the recording heads 2K, 2C, 2M, and 2Y while moving the continuous paper 3 relative to the recording heads 2K, 2C, 2M, and 2Y in a second direction y that is orthogonal to a predetermined first direction x. There are four recording heads 2K, 2C, 2M, and 2Y disposed for respective colors in the first exemplary embodiment in the second direction y. The recording heads 2K, 2O, 2M, and 2Y each include nozzles 2a, serving as exemplary recording elements, that are arranged in the predetermined first direction x. The first direction x is also a direction of arrangement of the nozzles 2a. The second direction y is also a transport direction of the continuous paper 3. The arrangement of the nozzles 2a of each of the recording heads 2K, 2C, 2M, and 2Y may be, for example, a two-dimensional arrangement in the first direction x and the second direction y, such as a staggered arrangement.

The continuous paper 3 is an exemplary recording medium. The recording medium is not limited to continuous paper. The recording medium may be cut paper, such as A4 cut paper. The recording medium is not limited to paper. The recording medium may be, for example, a plastic sheet or a metallic member.

The recording heads 2K, 2C, 2M, and 2Y discharge ink drops of basic colors, that is, black (K), cyan (C), magenta (M), and yellow (Y), respectively, from the nozzles 2a thereof.

The ink colors are not limited to K, C, M, and Y. It is possible to use five or more recording heads and to use five or more ink colors. Such five or more colors that are used include, in addition to the four colors (K, C, M, and Y), light ink colors, such as light cyan and light magenta, and metallically glossy colors, such as gold and silver. The order of arrangement of the recording heads 2K, 2C, 2M, and 2Y are not limited to that according to the first exemplary embodiment.

The test pattern 1 includes first pattern areas 4K, 4C, and 4M, a second pattern area $4Y_1$, and a third pattern area $4Y_2$. Patterns having colors (K, C, and M in the first exemplary embodiment) whose brightnesses differ from that of a ground color (white in the first exemplary embodiment) of the continuous paper 3 by a difference that is greater than or equal to a predetermined brightness difference are recorded in the first pattern areas 4K, 4C, and 4M. Patterns having a color (Y in the first exemplary embodiment) whose brightness differs from that of the ground color of the continuous paper 3 by a difference that is less than the predetermined brightness difference are recorded in the second pattern area $4Y_1$ and the third pattern area $4Y_2$. The color whose brightness differs from that of the ground color of the continuous paper 3 by a difference that is less than the predetermined brightness difference is not limited to yellow (Y). Therefore, other colors or two or more colors may be used.

The first pattern areas 4K, 4C, and 4M are used, for example, in an automatic determination operation by machine reading and in a visual determination operation in which the continuous paper 3 is directly viewed by a person, which are described later. The second pattern area $4Y_1$ is used, for example, in an automatic determination operation by machine reading. The third pattern area $4Y_2$ is used, for example, in a visual determination operation in which the continuous paper 3 is directly viewed by a person by irradiating the continuous paper 3 with blue light.

In FIG. 1, 5K, 5C, 5M, and 5Y indicate first horizontal lines and 6K, 6C, 6M, and 6Y indicate second horizontal lines. The first horizontal lines 5K, 5C, 5M, and 5Y and the second horizontal lines 6K, 6C, 6M, and 6Y are formed for the purpose of suppressing problems related to discharge from the nozzles 2a (such as clogging of the nozzles 2a, displacement of recording positions, and changes in recording density) by cleaning the nozzles 2a with ink.

The lengths of the first horizontal lines 5K, 5C, 5M, and 5Y and the lengths of the second horizontal lines 6K, 6C, 6M, and 6Y in the second direction y are not limited to those shown in FIG. 1. In addition, some of the horizontal lines may be omitted, or the number of horizontal lines may be increased. The first horizontal lines 5K, 5C, 5M, and 5Y and/or the second horizontal lines 6K, 6C, 6M, and 6Y may form the test pattern 1.

Structure of Each Pattern Area

Figure 2:
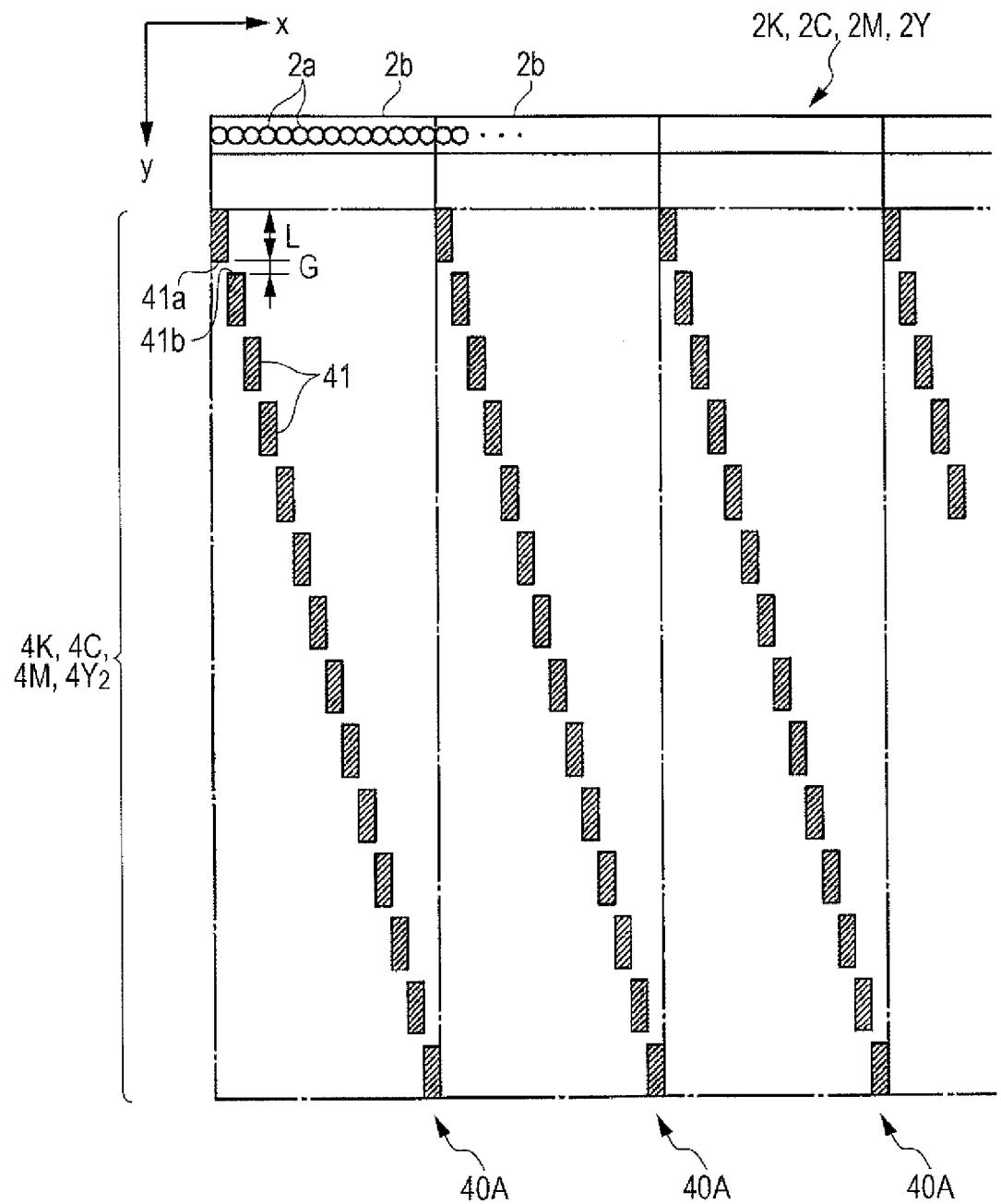
FIG. 2 shows in detail first pattern areas and a third pattern area.
Figure 3:
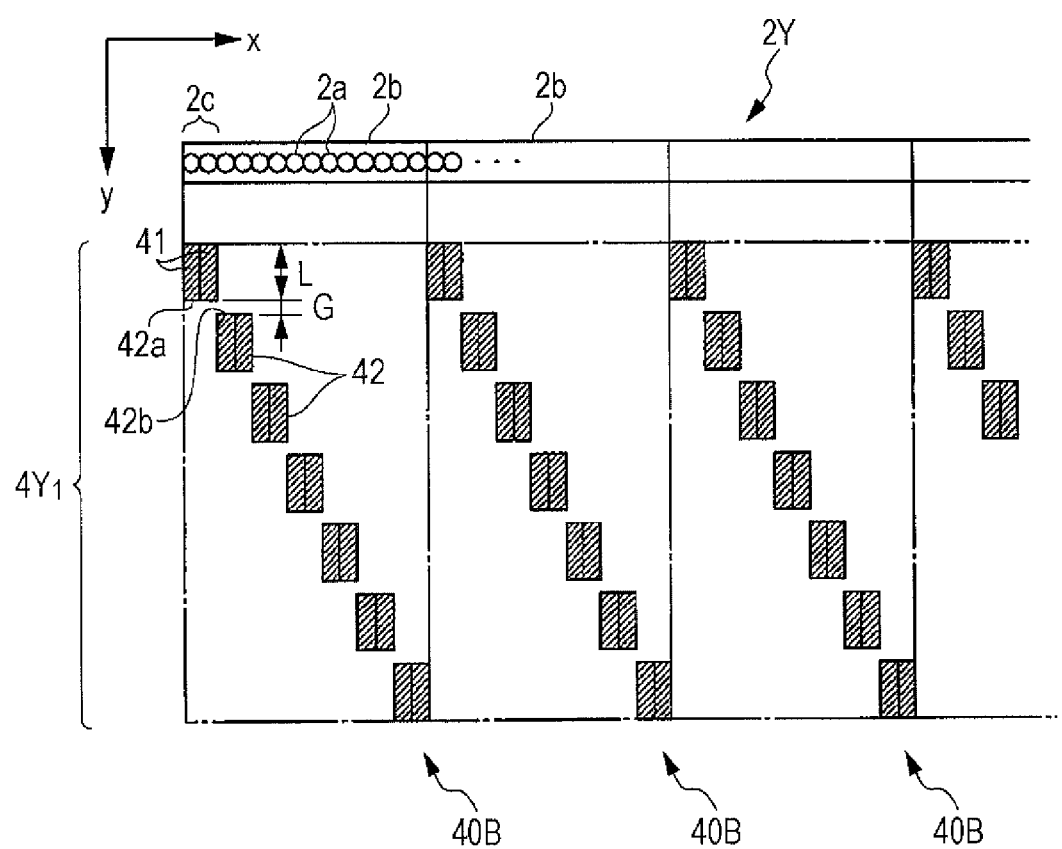
FIG. 3 shows in detail a second pattern area.

FIG. 2 shows in detail the first pattern areas 4K, 4C, and 4M and the third pattern area $4Y_2$. FIG. 3 shows in detail the second pattern area $4Y_1$.

First Pattern Areas

As shown in FIG. 2, stepped patterns 40A are periodically formed in the first direction x in the first pattern areas 4K, 4C, and 4M in correspondence with respective nozzle groups 2b including a predetermined number of nozzles 2a (fourteen in the first exemplary embodiment) of the recording heads 2K, 2C, and 2M. In each of the stepped patterns 40A, straight-line patterns 41 having a same length L and extending in the second direction y are formed in a stepwise manner in correspondence with the respective nozzles 2a of each of the recording heads 2K, 2C, and 2M such that a gap G in the second direction y is formed between a back end 41a of each straight-line pattern 41 and a front end 41b of the straight-line pattern 41 that is adjacent thereto. That is, the straight-line patterns 41 are formed in a stepwise manner in the first pattern areas 4K, 4C, and 4M with respective K, C, and M inks.

Third Patten Area

As shown in FIG. 2, as with the first pattern areas 4K, 4C, and 4M, stepped patterns 40A are periodically formed in the first direction x in the third pattern area $4Y_2$ in correspondence with respective nozzle groups 2b. In each of the stepped patterns 40A, straight-line patterns 41 having a same length L and extending in the second direction y are formed using yellow (Y) ink in a stepwise manner in correspondence with the respective nozzles 2a such that a gap G in the second direction y is formed between a back end 41a of each straight-line pattern 41 and a front end 41b of the straight-line pattern 41 that is adjacent thereto.

Second Pattern Area

As shown in FIG. 3, stepped patterns 403 are periodically formed in the first direction x in the second pattern area $4Y_1$ in correspondence with respective nozzle groups 2b including a predetermined number of nozzles 2a (fourteen in the first exemplary embodiment) of the recording head 2Y.

In each stepped pattern 40B, straight-line columns 42 having a same length L and extending in the second direction y are formed using yellow (Y) ink in a stepwise manner in correspondence with respective sets 2c of consecutively provided nozzles 2a of the recording head 2Y such that a gap G in the second direction y is formed between a back end 42a of each straight-line pattern column 42 and a front end 42b of the straight-line pattern column 42 that is adjacent thereto. In each set 2c, a predetermined number of nozzles 2a, that is, two or more nozzles 2a (two in the first exemplary embodiment) are consecutively provided. Each straight-line pattern column 42 includes two straight-line patterns 41 extending in the second direction y. In FIG. 3, the two straight-line patterns 41 of each straight-line pattern column 42 are shown so that a gap does not exist between the two straight-line patterns 41. However, a gap may be formed between the two straight-line patterns 41.

Order of Formation of Pattern Areas

As shown in FIG. 1, by forming the second pattern area $4Y_1$ after forming the third pattern area $4Y_2$, since the first pattern areas 4K, 4C, and 4M and the third pattern area $4Y_2$, used for a visual determination operation, are consecutively provided, the visual determination operation is facilitated. Since straight-line patterns 41 of the first pattern areas 4K, 4C, and 4M and the third pattern area $4Y_2$ that are consecutively provided are capable of being formed under the same discharge control, the discharge control is facilitated. The order of arrangement of the third pattern area $4Y_2$ and the second pattern area $4Y_1$ may be changed. By forming the third pattern area $4Y_2$ after forming the second pattern area $4Y_1$, it is possible to continuously perform machine reading, so that an output of results of determination is accelerated.

Length L of Patterns

The length L of each of the straight-line patterns 41 and the length L of each of the straight-line pattern columns 42 in the second direction y are determined on the basis of, for example, the speed of the continuous paper 3, the precision of machine reading, and a printable size (such as the vertical length of an A4 size) of the test pattern 1 in the second direction y. For example, it is necessary to increase each length L as the speed of the continuous paper 3 is increased, whereas an upper limit of each length L is set so as to be within a printable size of the test pattern 1.

Reasons for Providing Gaps G

Figure 4A:
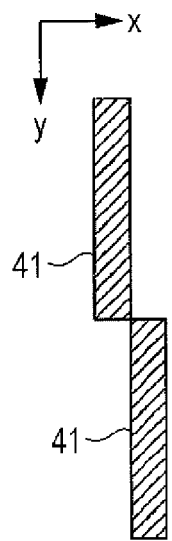
FIGS. 4A to 4C are illustrations for explaining the reasons for providing a gap between a back end of a straight-line pattern and a front end of another straight-line pattern and for providing a gap between a back end of a straight-line pattern column and a front end of another straight-line pattern column.
Figure 4B:
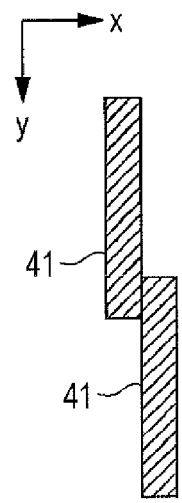
Figure 4C:
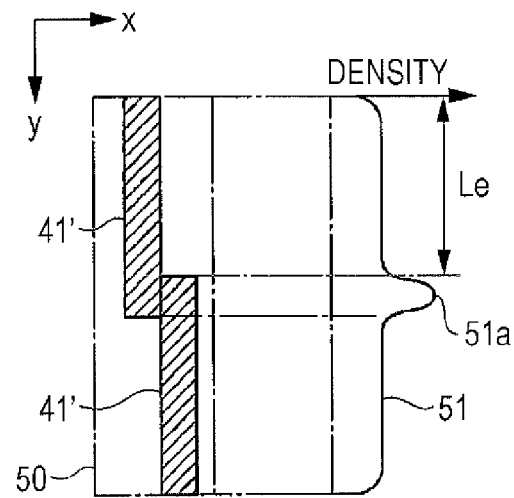

FIGS. 4A to 4C are illustrations for explaining the reasons for providing a gap G in the second direction y between the back end 41a of each straight-line pattern 41 and the front end 41b of the straight-line pattern 41 that is adjacent thereto and for providing a gap G in the second direction y between the back end 42a of each straight-line pattern column 41 and the front end 42b of the straight-line pattern column 41 that is adjacent thereto.

As shown in FIG. 4A, when a gap in the second direction y is not provided between the back end 41a of a straight-line pattern 41 and the front end 41b of another straight-line pattern 41 that is adjacent thereto, for example, variations in the speed of the continuous paper 3 or shifts in discharge timings of ink drops may cause, as shown in FIG. 4B, the straight-line patterns 41 to be displaced and, thus, portions of the straight-line patterns 41 to overlap each other in the second direction y. In such a case, as shown in FIG. 4C, when a profile 51 (in which brightnesses of respective pixels of a photographic image 50 including straight-line pattern images 41' obtained by photographing the straight-line patterns 41 are projected in the first direction x) is obtained, the value of a density 51a of an overlapped portion of the straight-line images 41' becomes larger than the values of other portions. As a result, an effective length Le where there are no overlapped portions becomes shorter than the proper length L. Therefore, peak values of density profiles along a line in the first direction x (described later using FIG. 5) may not be obtained (may not be read by a machine).

In order to prevent a reading error such as that described above, in the first exemplary embodiment, as shown in FIG. 2, a gap G in the second direction y is provided between the back end 41a of each straight-line pattern 41 and the front end 41b of the straight-line pattern 41 that is adjacent thereto; and, as shown in FIG. 3, a gap G in the second direction y is provided between the back end 42a of each straight-line pattern column 42 and the front end 42b of the straight-line pattern column 42 that is adjacent thereto.

The gaps G are previously set considering, for example, variations in the speed of the continuous paper 3 and shifts in discharge timings of ink drops such that space is necessarily formed between the back end 41a of each straight-line pattern 41 and the front end 41b of the straight-line pattern 41 that is adjacent thereto and the back end 42a of each straight-line pattern column 42 and the front end 42b of the straight-line pattern column 42 that is adjacent thereto.

For the same reason that the gaps G are formed in the stepped patterns 40A and 40B shown in FIGS. 2 and 3, it is desirable to also form gaps about the size of the gaps G between the first horizontal lines 5K and 5C, between the first horizontal lines 5C and 5M, between the first horizontal lines 5M and 5Y, between the second horizontal line 6K and the first pattern area 4K, between the second horizontal line 6C and the first pattern area 4C, between the second horizontal line 6M and the first pattern area 4M, between the second horizontal line 6Y and the third pattern area $4Y_2$, and between the second horizontal line 6Y and the second pattern area $4Y_1$.

Reasons for Providing Straight-Line Pattern Columns

Figure 5:
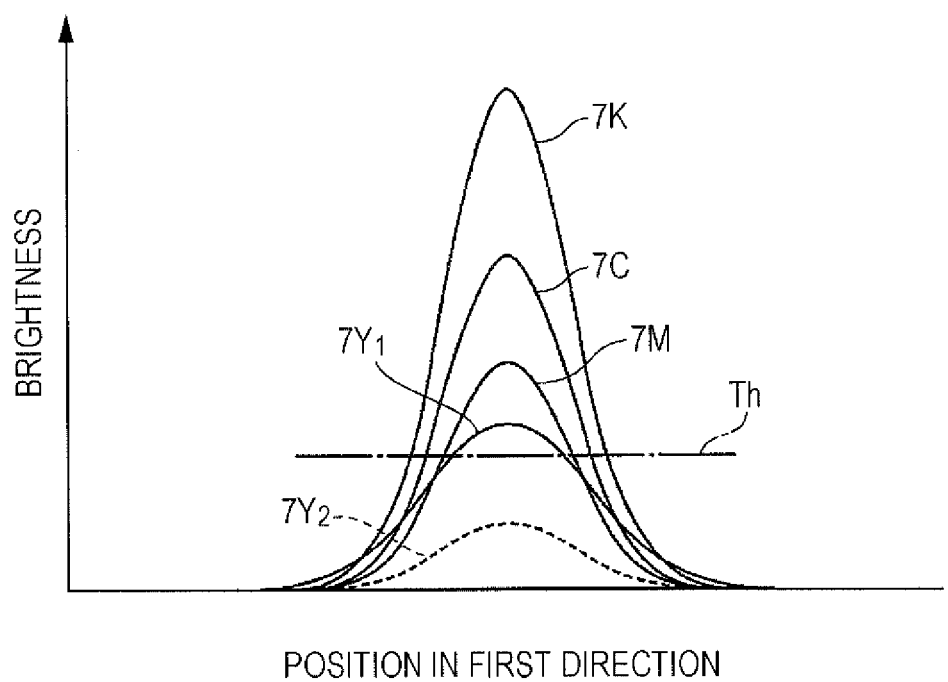
FIG. 5 is an illustration for explaining the reasons for forming stepped patterns in the second pattern area out of straight-line pattern columns.

FIG. 5 is an illustration for explaining the reasons for forming the stepped patterns 403 in the second pattern area $4Y_1$ out of the straight-line pattern columns 42. FIG. 5 shows brightness profiles along a line in the first direction x of photographic images that are obtained by photographing the straight-line patterns 41 and the straight-line pattern columns 42 for the associated colors, K, C, M, and Y, using a charge coupled device (CCD) camera.

In FIG. 5, the brightness profiles indicated by 7K, 7C, 7M, and $7Y_1$ are related to one straight-line pattern 41. FIG. 5 shows that peak values of the brightness profiles 7K, 7C, 7M, and $7Y_1$ become smaller in the order K, C, M, and $Y_1$. The brightness profile indicated by $7Y_2$ is related to a straight-line pattern column 42 including two straight-line patterns 41. FIG. 5 shows that the peak value of the brightness profile $7Y_2$ is less than the peak value of the brightness profile $7Y_1$.

A determination as to whether or not a problem related to nozzle discharge has occurred is performed, for example, as follows. When the peak values of the brightness profiles 7K, 7C, 7M, and $7Y_1$ shown in FIG. 5 are compared with a threshold value Th, if the peak values are greater than or equal to the threshold value Th, it is determined that a problem related to nozzle discharge (such as clogging of nozzles) has not occurred; whereas if the peak values are less than the threshold value Th, it is determined that a problem related to nozzle discharge (such as clogging of nozzles) has occurred. Setting the threshold value Th to a low value may cause an erroneous determination caused by noise. Therefore, it is necessary to set the threshold value Th to a somewhat high value. Since the peak value of the brightness profile of yellow is less than those of the other colors, the peak value of the brightness profile $7Y_2$ of the one straight-line pattern 41 is less than or equal to the threshold value Th, as a result of which it may be erroneously determined that a problem related to nozzle discharge has occurred even if such a problem has not occurred. In contrast, since the peak value of the brightness profile $7Y_1$ of the two straight-line patterns 41 is greater than or equal to the threshold value Th, it is possible to suppress an erroneous determination regarding the occurrence of a problem related to nozzle discharge.

Whether or not a problem related to nozzle discharge has occurred may be determined using different threshold values Th for respective colors. When it is determined whether or not a problem related to nozzle discharge has occurred using one threshold value Th, even if the peak values of the colors, such as black and cyan, having relatively high peak values in their brightness profiles are reduced due to the occurrence of a slight problem related to nozzle discharge, this reduction may be overlooked. However, it is possible to reduce the overlooking of this reduction by using different threshold values for the respective colors.

As regards a color (Y in the first exemplary embodiment) having a brightness differing from that of the ground color of the continuous paper 3 by a difference that is less than a predetermined brightness difference, even if one straight-line pattern 41 is missing, image quality is rarely affected. However, if two consecutive straight-line patterns 41 are missing, the image quality is affected. Therefore, it is determined whether or not a problem related to nozzle discharge has occurred on the basis of a straight-line pattern column 42 including two straight-line patterns 41. When an attempt is made to perform a visual determination operation using a straight-line pattern column 42 including two straight-line patterns 41, it is difficult to determine whether one straight-line pattern 41 or two straight-line patterns 41 are printed. In contrast, since it is easy to determine whether or not one straight-line pattern 41 is printed, a visual determination operation is performed using the third pattern area $4Y_2$.

Second Exemplary Embodiment

Figure 6:
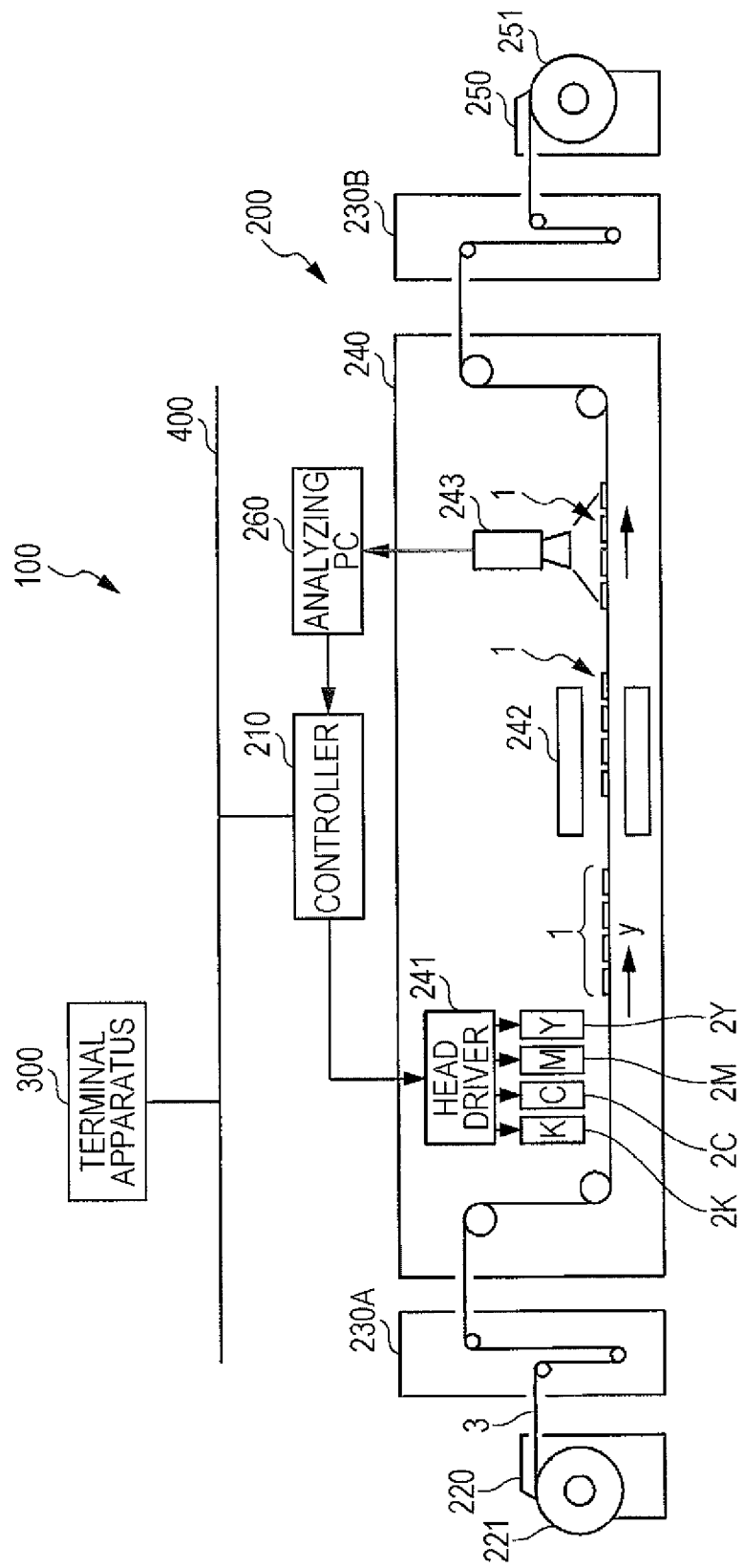
FIG. 6 shows an exemplary schematic structure of an image forming system according to a second exemplary embodiment of the present invention.

FIG. 6 shows an exemplary schematic structure of an image forming system 100 according to a second exemplary embodiment of the present invention. In the image forming system 100, an image forming apparatus 200 and a terminal apparatus 300, such as a personal computer (PC), are connected to each other via a network 400, such as a local area network (LAN). The image forming apparatus 200 performs printing on continuous paper 3 at a high speed. The terminal apparatus 300 sends a print job to the image forming apparatus 200.

The image forming apparatus 200 includes a controller 210, a preprocessing device 220, a printer 240, a postprocessing device 250, buffer devices 230A and 230B, and an analyzing personal computer (PC) 260. The controller 210 controls the entire image forming apparatus 200 and is connected to the network 400. The preprocessing device 220 sends out the continuous paper 3 wound upon a send-out roller 221. The printer 240 prints an image on the continuous paper 3. The postprocessing device 250 causes the continuous paper 3 on which the image has been printed to be taken up upon a take-up roller 251. The buffer device 230A is provided between the preprocessing device 220 and the printer 240. The buffer device 230B is provided between the printer 240 and the postprocessing device 250. The buffer devices 230A and 230B apply tension to the continuous paper 3. The analyzing PC 260 is connected between the controller 210 and a photographing device 243 (described later). The controller 210 is an example of a computer that controls the printer 240. The analyzing PC 260 may be a server that is connected to the controller 210 via the network 400.

The postprocessing device 250 may cut the continuous paper 3 to a predetermined size (such as an A4 size). By this, a visual determination operation is performed by taking out only a sheet on which the test pattern 1 is printed, so that the visual determination operation is facilitated.

In the printer 240, recording heads 2K, 2C, 2M, and 2Y including nozzles 2a disposed in a first direction x (that is, a direction that is orthogonal to a plane of FIG. 6) are disposed in a second direction y. The printer 240 also includes a head driver 241 that drives the recording heads 2K, 2C, 2M, and 2Y. Under control of the controller 210, the head driver 241 controls the jetting amount of ink drops of the associated colors (K, C, M, and Y) for the recording heads 2K, 2C, 2M, and 2Y. The printer 240 further includes a drying unit 242 and the photographing device 243. The drying unit 242 dries the ink drops that have been jetted to the continuous paper 3 and fixes the ink drops to the continuous paper 3. The photographing device 243, such as a charge coupled device (CCD) camera, photographs the test pattern 1 fixed to the continuous paper 3. The drying unit 242 may dry the ink drops from either one of an upper side and a lower side of the continuous paper 3, or from both the upper and lower sides of the continuous paper 3. Alternatively, the drying unit 242 may dry the ink drops by a contact method or a non-contact method.

Structure of Controller

Figure 7:
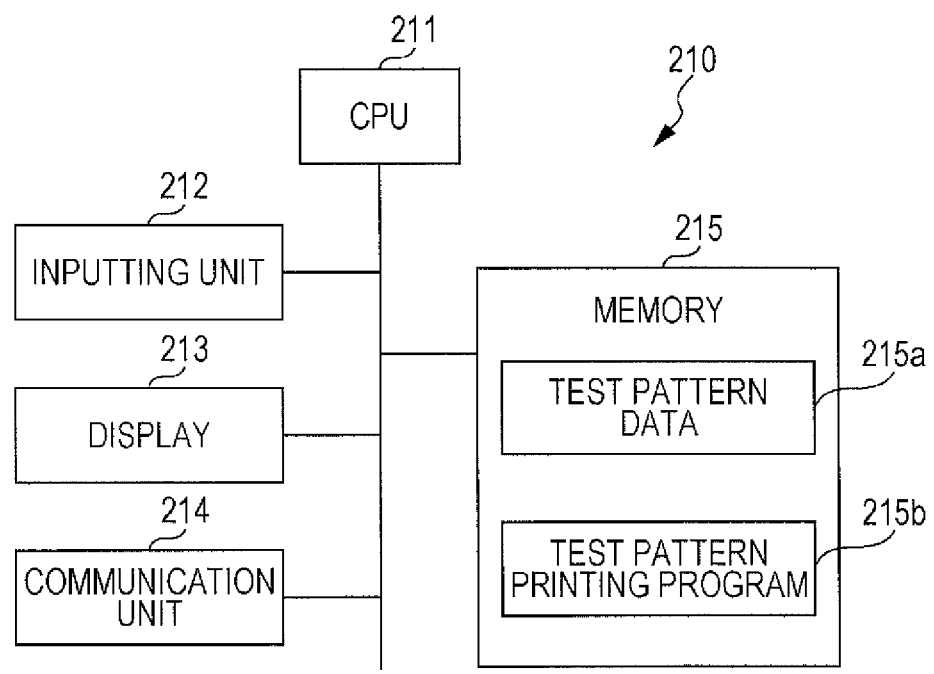
FIG. 7 is a block diagram of an exemplary schematic structure of a controller.

FIG. 7 is a block diagram of an exemplary schematic structure of the controller 210. The controller 210 includes a central processing unit (CPU) 211. For example, an inputting unit 212, a display 213, a communication unit 214, and a memory 215 are connected to the CPU 211.

The inputting unit 212 includes, for example, a keyboard and a mouse. The display 213 is, for example, a liquid crystal display and displays various pieces of information, such as results of determination of the test pattern 1. The communication unit 214 is connected to the network 400 and sends information to and receives information from the terminal apparatus 300.

The memory 215 is, for example, a read only memory (ROM), a random access memory (RAM), or a hard disk drive (HDD). The memory 215 stores various pieces of data, such as test pattern data 215a, which corresponds to the test pattern 1, and various programs, such as a test pattern printing program 215b, used for printing the test pattern 1.

The test pattern printing program 215b causes the CPU 211 to execute a first processing operation and a second processing operation. In the first processing operation, the test pattern data 215a is read out from the memory 215. In the second processing operation, the test pattern 1 is printed onto the continuous paper 3 on the basis of the read out test pattern data 215a.

In accordance with the programs stored in the memory 215, the CPU 211 controls each portion of the image forming apparatus 200. That is, the CPU 211 performs control such that, when a print job is sent from the terminal apparatus 300 via the network 400 and the communication unit 214, images included in this print job (hereunder referred to as "actual images") are printed on the continuous paper 3 and the test pattern 1 corresponding to the test pattern data 215a is printed onto the continuous paper 3 in accordance with the test pattern printing program 215b at a predetermined timing (for example, each time the actual images are printed onto 1000 pages). On the basis of, for example, photographic images photographed by the photographing device 243 and a threshold value required for determining whether or not a problem related to nozzle discharge has occurred, the analyzing PC 260 determines whether or not a problem related to nozzle discharge has occurred and sends the results of determination to the controller 210. The CPU 211 of the controller 210 causes the display 213 to display the results of determination.

Operation of Image Forming System 100

Next, an exemplary operation of the image forming system 100 is described.

(1) Printing of Test Pattern 1

When a print job is sent to the controller 210 from the terminal apparatus 300 via the network 400, the CPU 211 of the controller 210 controls the head driver 241 such that the actual images that are included in the print job are printed onto the continuous paper 3 and the test pattern 1 corresponding to the test pattern data 215a stored in the memory is printed onto the continuous paper 3 at a predetermined timing (for example, each time the actual images are printed onto 1000 pages). The test pattern 1 is printed onto the continuous paper 3 at the predetermined timing.

(2) Automatic Determination Operation

The test pattern 1 printed on the continuous paper 3 is dried by the drying unit 242 and is fixed to the continuous paper 3, after which the test pattern 1 is photographed by the photographing device 243. The photographing device 243 sends the photographic image of the photographed test pattern 1 to the analyzing PC 260. The analyzing PC 260 obtains the peak values of the associated brightness profiles 7K, 7C, and 7M along a line in the first direction x passing through straight-line patterns 41 from the photographic images of stepped patterns 40A of the first pattern areas 4K, 4C, and 4M (machine reading). The analyzing PC 260 obtains the peak value of the brightness profile $7Y_1$ along a line in the first direction x passing through straight-line pattern columns 42 from the photographic images of stepped patterns 40B of the second pattern area $4Y_1$ (machine reading). Next, the analyzing PC 260 compares the obtained peak values with the threshold value Th. If the peak values are greater than or equal to the threshold value Th, the analyzing PC 260 determines that a problem related to nozzle discharge has not occurred, whereas if the peak values are less than the threshold value Th, the analyzing PC 260 determines that a problem related to nozzle discharge has occurred and identifies the nozzle 2a or the nozzles 2a where a problem related to nozzle discharge has occurred. Then, the analyzing PC 260 sends results of determination to the controller 210. The CPU 211 of the controller 210 causes the results of determination to be displayed on the display 213.

The continuous paper 3 on which the actual images and the test pattern 1 have been printed is taken up upon the take-up roller 251 by the postprocessing device 250.

(3) Visual Determination Operation

The continuous paper 3 that has been taken up by the take-up roller 251 is subjected to a visual determination operation. That is, a visual determination operation is performed on the first pattern areas 4K, 4C, and 4M to find out whether or not any straight-line patterns 41 are missing. A visual determination operation is performed on the third pattern area $4Y_2$ to find out whether or not any straight-line patterns 41 are missing by irradiating the continuous paper 3 with blue light.

Advantages of Second Exemplary Embodiment

The second exemplary embodiment provides the following advantages:

(1) By forming the first pattern areas 4K, 4C, and 4M and the third pattern area $4Y_2$ as the test pattern 1, it is possible to visually determine whether or not a problem related to nozzle discharge has occurred at any of the nozzles for the associated colors K, C, M, and Y.

(2) By forming the first pattern areas 4K, 4C, and 4M and the second pattern area $4Y_1$ as the test pattern 1, it is possible to automatically determine whether or not a problem related to nozzle discharge has occurred at any of the nozzles for the associated colors K, C, M, and Y. Therefore, it is possible to determine whether or not a problem related to nozzle discharge has occurred by both a visual determination operation and an automatic determination operation.

(3) By forming a gap G in the second direction y between the back end 41a of each straight-line pattern 41 and the front end 41b of the straight-line pattern 41 that is adjacent thereto and the back end 42a of each straight-line pattern column 42 and the front end 42b of the straight-line pattern column 42 that is adjacent thereto, it is possible to suppress a reduction in the effective length Le in the second direction y of the straight-line pattern images 41' caused by the overlapping of the straight-line pattern images 41'.

(4) By forming the stepped patterns 40B of the second pattern area $4Y_1$ out of straight-line pattern columns 42 as regards a color whose brightness differs from that of a ground color of the continuous paper 3 by a difference that is less than a predetermined brightness difference, it is possible for the peak value of a density profile along a line in the first direction x to be greater than that when each of the stepped patterns 40B is formed out of one straight-line pattern 41. Therefore, it is possible to suitably arrange the patterns that are recorded in the first pattern areas 4K, 4C, and 4M, the second pattern area $4Y_1$, and the third pattern area $4Y_2$, provided for the associated colors, in correspondence with the associated colors.

(5) By periodically forming the stepped patterns 40A and the stepped patterns 40B in the first direction x, when the number of recording elements for increasing resolution is increased, it is possible to reduce an increase in the length of the test pattern in the second direction.

Exemplary Embodiment

Figure 8A:
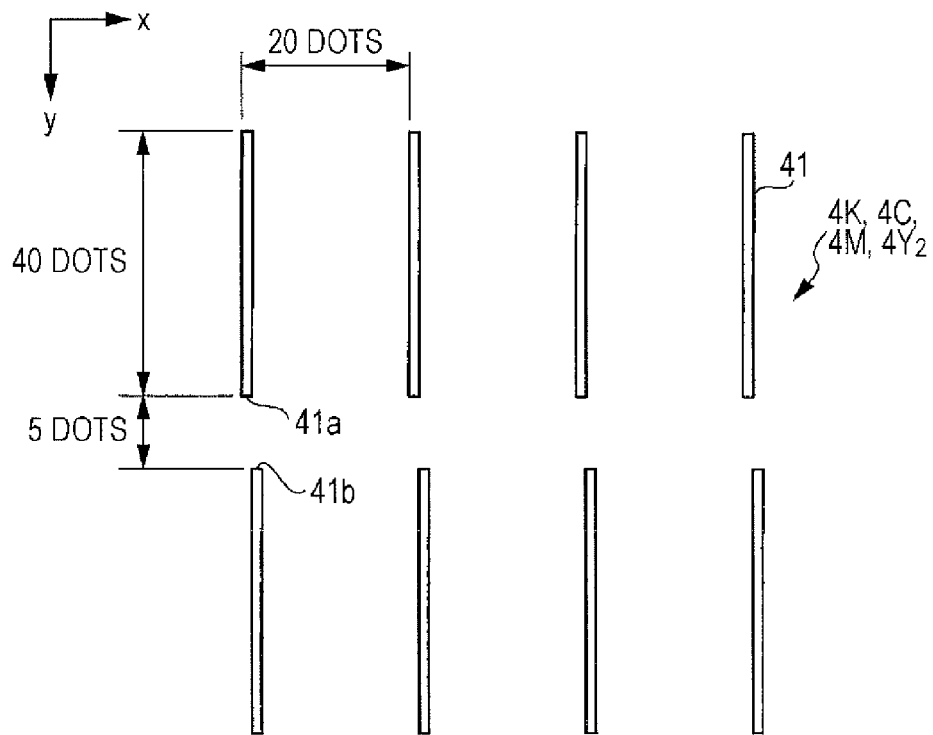
FIGS. 8A and 8B show a principal portion of a test pattern according to an exemplary embodiment of the present invention, with FIG. 8A showing straight-line patterns of stepped patterns and FIG. 8B showing straight-line pattern columns of stepped patterns.
Figure 8B:
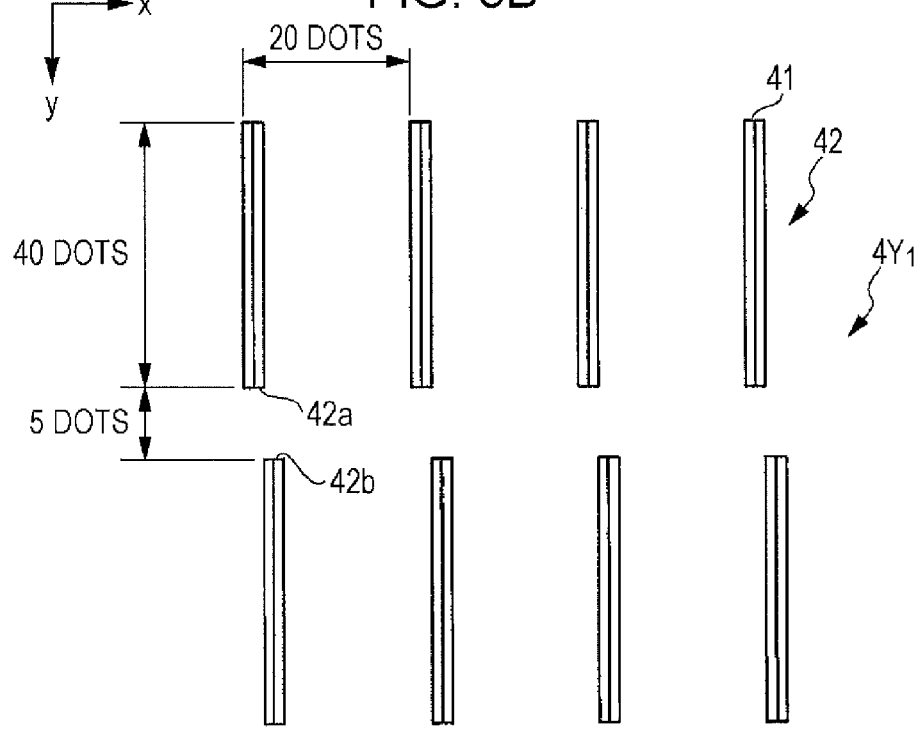

FIGS. 8A and 8B show a principal portion of a test pattern 1 according to an exemplary embodiment of the present invention. FIG. 8A shows straight-line patterns 41 of stepped patterns 40A and FIG. 83 shows straight-line pattern columns 42 of stepped patterns 40B.

In the exemplary embodiment, using recording heads providing 600 dpi (dot per inch) and 12000 dots as the recording heads 2K, 2C, 2M, and 2Y, one stepped pattern 40A is formed for every 20 dots and one stepped pattern 40B is formed for every 20 dots with a transport speed of continuous paper 3 being 200 m/min.

As shown in FIG. 8A, a pitch in the first direction x between the straight-line patterns 41 of the stepped patterns 40A is 0.85 mm, which is equivalent to 20 dots; the length in the second direction y of each straight-line pattern 41 is 1.69 mm, which is equivalent to 40 dots; and a gap G in the second direction y between the back end 41a of each straight-line pattern 41 and the front end 41b of the straight-line pattern 41 that is adjacent thereto is 0.21 mm, which is equivalent to 5 dots.

As shown in FIG. 8B, a pitch in the first direction x between the straight-line pattern columns 42 of the stepped patterns 40B is 0.85 mm, which is equivalent to 20 dots; the length in the second direction y of each straight-line pattern 42 is 1.69 mm, which is equivalent to 40 dots; and a gap G in the second direction y between the back end 41a of each straight-line pattern column 42 and the front end 41b of the straight-line pattern column 42 that is adjacent thereto is 0.21 mm, which is equivalent to 5 dots.

Modification

The present invention is not limited to the above-described exemplary embodiments. Various modifications may be made within a scope that does not change the gist of the present invention.

For example, since the third pattern area $4Y_2$ is for a visual determination operation, the gap G in the second direction y between the back end 41a of each straight-line pattern 41 and the front end 41b of the straight-line pattern 41 that is adjacent thereto in the third pattern area $4Y_2$ may be shorter than the gap G in the second direction y between the back end 41a of each straight-line pattern 41 and the front end 41b of the straight-line pattern 41 that is adjacent thereto in each of the first pattern areas 4K, 4C, and 4M. As shown in FIG. 9, stepped patterns 40C in which a gap in the second direction y is not provided between the back end 41a of each straight-line pattern 41 and the front end 41b of the straight-line pattern 41 that is adjacent thereto in the third pattern area $4Y_2$ may be provided.

Although, in the above-described exemplary embodiments, the case in which the present invention is applied to inkjet recording heads of a liquid drop discharging apparatus, serving as recording heads, is described as an example, the present invention may be applied to other recording heads, such as recording heads of a light emitting diode (LED) printer or a thermal printer.

An LED printer is, for example, one that includes LED printer heads that are disposed for respective colors in the second direction y and that include light emitting elements arranged in the first direction x as recording elements. The LED printer also includes exposure units and developing units. Each exposure unit forms an electrostatic latent image on a photoconductor member by causing the light emitting elements to emit light in accordance with image data. Each developing unit forms a color image by developing the electrostatic latent image formed by its corresponding exposure unit. By applying the test pattern data and the test pattern printing program according to the exemplary embodiments of the present invention to the LED printer, it is possible to identify which light emitting element or light emitting elements are light emitting elements where a problem related to a recording operation is occurring, for example, where light is not emitted or an improper emission of light is occurring.

A thermal printer is, for example, one that includes thermal heads that are disposed for respective colors in the second direction y and that include heating elements arranged in the first direction x as recording elements. In the thermal printer, a voltage is applied to each heating element in accordance with image data and the heating elements are pressed against multilayer thermosensitive paper having different color forming temperatures that depend upon layer, to form a color image. By applying the test pattern data and the test pattern printing program according to the exemplary embodiments of the present invention to such a thermal printer, it is possible to identify which heating element or heating elements are heating elements where a problem related to a recording operation is occurring, for example, where a driving operation is not performed or the pressing force is not enough.

In the above-described exemplary embodiments, programs are previously installed. However, it is possible to store programs in a storage medium that is capable of being read by a computer, such as CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of printing a test pattern data corresponding to a test pattern on a recording medium, the method comprising:
    driving a plurality of recording heads while moving the recording medium relative to the plurality of recording heads in a second direction that is orthogonal to a predetermined first direction, the plurality of recording heads being arranged for respective colors in the second direction and including a plurality of recording elements that are arranged in the first direction,
    wherein the test pattern includes a first pattern area and a second pattern area, whereby:
        recorded in the first pattern area is a pattern which has a color whose brightness differs from that of a ground color of the recording medium by a difference that is greater than or equal to a predetermined brightness difference, and
        recorded in the second pattern area is a pattern which has a color whose brightness differs from that of the ground color of the recording medium by a difference that is less than the predetermined brightness difference,
    wherein, provided in the first pattern area are patterns having a same length and extending in the second direction in a stepwise manner in correspondence with the respective recording elements such that a gap in the second direction is provided between a back end of one of the patterns or each pattern and a front end of another one of the patterns that is adjacent thereto, and
    wherein, provided in the second pattern area are pattern columns having a same length and extending in the second direction in a stepwise manner in correspondence with positions of a set of a predetermined number of consecutively provided recording elements such that a gap in the second direction is provided between a back end of one of the pattern columns or each pattern column and a front end of another one of the pattern columns that is adjacent thereto, the predetermined number of consecutively provided recording elements being two or more consecutively provided recording elements.

2. The test pattern data according to claim 1, wherein the set of the predetermined number of consecutively provided recording elements positioned to correspond to the pattern columns that are provided in the second pattern area is a set of two consecutively provided recording elements.

3. The test pattern data according to claim 1, wherein the test pattern further includes a third pattern area, a pattern which has a color whose brightness differs from that of the ground color of the recording medium by a difference that is less than the predetermined brightness difference being recorded in the third pattern area, and
    wherein, in the third pattern area, patterns having a same length and extending in the second direction are provided in a stepwise manner in correspondence with the respective recording elements such that a gap in the second direction is provided between a back end of one of the patterns or each pattern and a front end of another one of the patterns that is adjacent thereto.

4. The test pattern data according to claim 3, wherein the gap or gaps in the second direction in the third pattern area are smaller than the gap or gaps in the second direction in the second pattern area, or are not provided.

5. The test pattern data according to claim 1, wherein the patterns having the colors whose brightnesses differ from that of the ground color of the recording medium are provided in correspondence with positioning of respective recording element groups including the predetermined number of consecutively provided recording elements.

6. A non-transitory computer readable medium storing a test pattern printing program causing a computer to execute a process for controlling a printer that prints a test pattern corresponding to the test pattern data according to claim 1 on the recording medium, the process comprising:
    performing a first processing operation of reading out the test pattern data from a memory; and
    performing a second processing operation of printing the test pattern on the recording medium based on the read out test pattern data.

7. A non-transitory computer readable medium having computer instructions embodied therein that, when executed by a computer, controls a printer to print a test pattern by a method, the method comprising:
    driving a plurality of recording heads while moving the recording medium relative to the plurality of recording heads in a second direction that is orthogonal to a predetermined first direction, the plurality of recording heads being arranged for respective colors in the second direction and including a plurality of recording elements that are arranged in the first direction,
    wherein the test pattern includes a first pattern area and a second pattern area, whereby:
        recorded in the first pattern area is a pattern which has a color whose brightness differs from that of a ground color of the recording medium by a difference, that is greater than or equal to a predetermined brightness difference, and
        recorded in the second pattern area is a pattern which has a color whose brightness differs from that of the ground color of the recording medium by a difference that is less than the predetermined brightness difference,
    wherein, provided in the first pattern area are patterns having a same length and extending in the second direction in a stepwise manner in correspondence with the respective recording elements such that a gap in the second direction is provided between a back end of one of the patterns or each pattern and a front end of another one of the patterns that is adjacent thereto, and wherein, provided in the second pattern area are pattern columns having a same length and extending in the second direction in a stepwise manner in correspondence with positions of a set of a predetermined number of consecutively provided recording elements such that a gap in the second direction is provided between a back end of one of the pattern columns or each pattern column and a front end of another one of the pattern columns that is adjacent thereto, the predetermined number of consecutively provided recording elements being two or more consecutively provided recording elements.

8. The non-transitory computer readable medium according to claim 7, wherein the set of the predetermined number of consecutively provided recording elements positioned to correspond to the pattern columns that are provided in the second pattern area is a set of two consecutively provided recording elements.

9. The non-transitory computer readable medium according to claim 7, wherein the test pattern further includes a third pattern area, a pattern which has a color whose brightness differs from that of the ground color of the recording medium by a difference that is less than the predetermined brightness difference being recorded in the third pattern area, and wherein, in the third pattern area, patterns having a same length and extending in the second direction are provided in a stepwise manner in correspondence with the respective recording elements such that a gap in the second direction is provided between a back end of one of the patterns or each pattern and a front end of another one of the patterns that is adjacent thereto.

10. The non-transitory computer readable medium according to claim 9, wherein the gap or gaps in the second direction in the third pattern area are smaller than the gap or gaps in the second direction in the second pattern area, or are not provided.

* * * * *